United States Patent Office 3,496,154
Patented Feb. 17, 1970

3,496,154
RANDOM COPOLYMERIZATION
Clinton F. Wofford, Bartlesville, Okla., assignor to Phillips Petroleum Company, a corporation of Delaware
No Drawing. Filed Oct. 15, 1965, Ser. No. 496,680
The portion of the term of the patent subsequent to Jan. 30, 1985, has been disclaimed and dedicated to the Public
Int. Cl. C08d 1/32
U.S. Cl. 260—84.7           6 Claims

ABSTRACT OF THE DISCLOSURE

A random copolymer of a conjugated diene and a vinyl-substituted aromatic compound is formed using an organolithium initiator, an organo-alkali metal compound such as potassium tert-butoxide, and a hexaalkylphosphoramide such as hexamethylphosphoramide.

---

This invention relates to a method for forming random copolymers. In one aspect this invention relates to a randomizing composition for forming random copolymers.

Heretofore organolithium compounds have been used to copolymerize monomers such as butadiene and styrene in a hydrocarbon diluent and block copolymers were formed. In order to obtain a random copolymer an additional compound was added. This additional compound is hereinafter called a "randomizing agent" or "randomizer." Polar compounds such as ethers were used as a randomizer but a high vinyl content coplyomer was formed. In general, with the use of certain organo-alkali metal randomizing agents, it was found that a low vinyl content random copolymer was former but substantial amounts of homopolymer blocks were also formed when the ratio of the atoms of alkali metal in the randomizing agent to the atoms of lithium in the initiator was less than 0.05:1. Also, hexaalkylphosphoramides have been used as randomizing agents but it was generally found that, although a low vinyl content random copolymer was formed, when the ratio of the mols of hexaalkylphosphoramide to the equivalents of lithium in the initiator was less than 0.2:1 substantial amounts of homopolymer blocks were formed in the copolymer product.

Quite surprisingly, it has now been found in the copolymerization of at least two members selected from the group consisting of conjugated dienes and vinyl substituted aromatics with an organolithium initiator in the presence of an organo-alkali metal randomizer in an atom ratio range of alkali metal in the randomizer to lithium in the initiator of from 0.05:1 to 0.007:1 substantially completely random low vinyl copolymers are formed, i.e. substantially no homopolymer blocks are present in the copolymer product, when a hexaalkylphosphoramide is also used in a ratio of mols of phosphoramide to atoms of lithium in the initiator in the range of from 0.2:1 to 0.01:1, preferably 0.1:1 to 0.01:1.

Also according to this invention, a randomizing composition is provided for organolithium initiated copolymerization in the form of a combination of an organo-alkali metal compound and a hexaalkylphosphoramide, said organo-alkali metal compound and said hexaalkylphosphoramide being present in amounts sufficient to provide the ratios for those compounds relative to the organolithium initiator as set forth in the preceding paragraph, i.e. the ratio of alkali metal atoms in said organo-alkali metal compound to mols of hexaalkylphosphoramide is from about 5:1 to about 0.035:1, preferably from about 5:1 to about 0.07:1.

Accordingly, it is an object of this invention to provide a new and improved method for forming random copolymers. Another object of this invention is to provide a new and improved randomizing composition.

Other aspects, objects and the several advantages of this invention will be readily apparent to those skilled in the art from the description and the appended claims.

The term "random copolymer" as applied to the polymer product of this invention is intended to include products ranging from those in which there is substantially no detectable homopolymer block, e.g. polyvinyl aromatic block up to copolymers containing about 1 weight percent of a homopolymer block. In general, the monomers, catalyst, and hydrocarbon diluent as well as the process conditions disclosed in U.S. Patent 2,975,160, issued to R. P. Zelinski on Mar. 14, 1961, the full disclosure of which is hereby incorporated herein by reference, can be employed in preparing the random copolymers of this invention.

The conjugated dienes that can be employed contain from 4 to 12 carbon atoms per molecule but preferably are 1,3-butadiene, isoprene, and piperylene. Mixtures of conjugated dienes can be used as well as mixtures of vinyl substituted aromatics and mixtures of conjugated dienes with vinyl substituted aromatic compounds. It is presently preferred that the monomer mixture contain at least one conjugated diene and at least one vinyl substituted aromatic. Examples of vinyl substituted aromatic compounds include styrene, divinylbenzene, vinylnapthalenes such as 1-vinylnapthalene, and alkyl substituted vinyl aromatics in which the alkyl group is attached to the ring, such as 3-methylstyrene, and the like.

Any member of the known class of organolithium polymerization initiators can be used. These initiators are organic compounds which have at least one carbon-lithium bond and generally are otherwise hydrocarbon but can contain functional groups which are inert to the polymerization reaction. The lithium compound most commonly used is that having the formula $RLi_x$, where R is an aliphatic, cycloaliphatic or aromatic hydrocarbon radical having about 1 to 20 carbon atoms and $x$ is an integer from 1 to 4. Examples of such compounds include methyllithium, n-butyllithium, phenyllithium, cyclohexyllithium, 1,5-dilithionaphthalene, and the like. The amount of initiator used is generally in the range of from about 0.05 to about 150 millimoles, preferaly 0.5 to 20 millimoles per 100 parts by weight of monomer.

The polymerization is preferably carried out in the presence of a hydrocarbon diluent which can be one or more aromatic, paraffinic, or cycloparaffinic compounds, preferably containing 4–10 carbon atoms per molecule. The solvent is a liquid under the conditions of the process, suitable examples being butane, n-pentane, isooctane, cyclohexane, benzene, toluene, xylene, ethylbenzene, hexane, and the like. Mixture of these solvents can be used.

The polymerization temperature can vary over a broad range, for example from −20 to 150° C., although a temperature less than 20° C. is seldom employed and a preferred temperature range is about 30 to 125° C. Pressure used is sufficient to maintain a substantially liquid phase in the reaction zone.

Upon completion of the polymerization reaction a shortstop such as water, and alcohol, e.g. ethyl alcohol or isopropyl alcohol and organic or inorganic acid, or other catalyst inactivating agent is employed and the polymer product recovered by any conventional method depending upon the type of polymer, i.e. rubbery, liquid and the like, formed. After inactivation of the catalyst and addition of any conventional additive such as antioxidant the polymer can be recovered by a technique such as coagulation with an alcohol such as ethyl alcohol or isopropyl alcohol, stripping of the diluent or the like. One method which can be employed comprises exposing the polymerization mixture to a reduced pressure to cause flashing of the diluent. The conditions in the flashing zone are controlled so as to remove up to about 50 percent of the diluent. Any unreacted monomer can also vaporize along with the diluent. Steam stripping can also be employed for forming a slurry of polymer crumb which crumb is then recovered and dried in a conventional manner.

The organo-alkali metal compound of the randomizing composition of this invention can be one or a mixture of two or more of compounds having the following formulas:

(1) R'M (2) R'(YM)$_n$ (3) 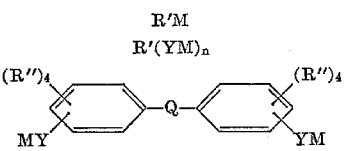

(4) 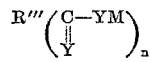

(5) 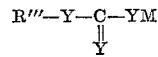

and (6) 

wherein R' is selected from the group consisting of aliphatic, cycloaliphatic and aromatic radicals, preferably containing from 1 to 20 carbon atoms, M is an alkali metal selected from the group consisting of sodium, potassium, rubidium and cesium, R'' is selected from the group consisting of hydrogen and aliphatic, cycloaliphatic and aromatic radicals, preferably containing from 1 to 6 carbon atoms, Q is selected from the group consisting of

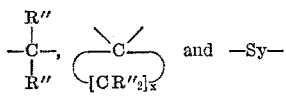

radicals, wherein R'' is as defined above, x is an integer from 4 to 5, inclusive, and y is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and n is an integer from 1 to 3, inclusive. It is to be understood that the aliphatic and cycloaliphatic radicals mentioned above can be saturated or unsaturated. Presently preferred organo-alkali metal compounds are the alkali metal salts, especially sodium and potassium salts, of a monohydric alcohol having from 1 to 20, more preferably 1 to 10, carbon atoms per molecule, inclusive.

Examples of organometal compounds corresponding to Formula 1 include the following: methylsodium, ethylpotassium, n-propylrubidium, isopropylcesium, tert-butylsodium, tert-amylsodium, n-hexylpotassium, cyclohexylrubidium, eicosylcesium, 4-methylcyclohexylsodium, 3-hexenylsodium, 2,5-decadienylpotassium, 3-cyclopentenylrubidium, 4,6-di-n-butyldecylsodium, 3,6-diphenyloctylpotassium, phenylsodium, 1-naphthylpotassium, 4-tolylpotassium, benzylsodium, 4-tert-butyl-6,7-diisopropyl-2-naphthylpotassium, and the like.

Formulas 2 and 3 define the alkali metal salts of mono- and polyhydric alcohols, mono- and polyhydric phenols, including bis-phenols, and sulfur analogs of the foregoing, that can be used in preparing the present catalyst system. Specific examples of compounds represented by Formula 2 include the sodium, potassium, rubidium, and cesium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentenyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxyoctane, 1,9,15-trihydroxypentadecane, 3(4-tolyl)propyl alcohol, benzyl alcohol, phenol, catechol, resorcinol, hydroquinone, pyrogallol, 1-naphthol, 2-naphthol, 2,6-di-tert-butyl-4-methylphenol (Ionol), 2,4,6-tri-tert-butylphenol, 2,6-di-tert-butylphenol, 2,6-di-tert-butyl-4-phenylphenol, 2,6-di-sec-butyl - 4 - methylphenol, ethanethiol, 1-butanethiol, 2-pentanethiol, 2-isobutanethiol, benzenethiol (thiophenol), 1,12-dodecanedithiol, 5,9-di-n-propyl-1,14-tetradecanedithiol, 2-naphthalenethiol, cyclohexanethiol, 2,5-di-n-hexyl-6-tert-butylbenzenethiol, 2,6-di-tert-butyl-4(4-tolyl)benzenethiol, 3-methylcyclohexanethiol, 2 - naphthalenethiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 3 are the sodium, potassium, rubidium and cesium salts of 2,2'-methylene-bis(4-methyl-6-tert-butylphenol), 2,2'-isopropylidene-bis(4-cyclohexyl - p - cresol), 4,4'-isopropylidenebis(2,6-dicyclohexylphenol), 4,4'-methylene-bis(2,6-diisopropylphenol), 2,2' - methylene - bis(6-benzyl-p-cresol), 2,2'-ethylidene-bis(5 - isopropylphenol), 1,1-bis(4-hydroxyphenyl)cyclohexane, 1,1-bis[2-hydroxy-3-(3-tolyl)]cyclopentane, 2,2' - ethylidene - bis(4-ethyl-6-tert-hexylthiophenol), 2,2'-propylidene-bis-(3,5-dimethyl-6-cyclopentylthiophenol), 4,4' - thio-bis(2,6 - di-tert-butylphenol), 4,4'-dithio-bis(2-n-propyl - 6 - tert-butylphenol), 4,4'-trithio-bis(3-methyl-6-isopropylphenol), and the like.

Specific examples of the alkali metal salts of mono- and polycarboxy acids and sulfur analogs as represented by Formula 4 include the sodium, potassium, rubidium and cesium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, hendecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthaleneacrylic acid, hexanethionic acid, 2,2-diethylbutanethiolic acid, decanethionic acid, tridecanethionothiolic acid, 4-tetradecanethionic acid, thiolbenzoic acid, thiono-1-naphthoic acid, and the like.

Specific examples of alkali metal carbonates and sulfur analogs as represented by the Formula 5 include the sodium, potassium, rubidium and cesium salts of tert-butylcarbonic acid, n-hexylcarbonic acid, 3,5-dimethylhexylcarbonic acid, n-dodecylcarbonic acid, 4,4-diethylhexylcarbonic acid, 3,6-diphenyloctylcarbonic acid, 7-dodecenylcarbonic acid, 3-cyclohexenylcarbonic acid, phenylcarbonic acid, O-tert-amyl ester of thiolcarbonic acid, O-tridecyl ester of thionocarbonic acid, O-eicosyl ester of thionothiocarbonic acid (xanthic acid), S-hexadecyl ester of dithiolcarbonic acid, S-(3-cyclohexenyl) ester of thiolcarbonic acid, phenyl ester of trithiocarbonic acid, and the like.

Specific examples of alkali metal salts of secondary amines as represented by Formula 6 include the sodium, potassium, rubidium and cesium salts of dimethylamine, di-n-butylamine, methyl-n-hexylamine, di(3,5-diethyloctyl)amine, di(8-phenyloctyl)amine, di(3-hexenyl)amine, diphenylamine, dibenzylamine, ethyl-4-tolylamine, n-propyl-n-eicosylamine, and the like.

The component which is added to the butyllithium-organo-alkali metal system and thereby allows the production of substantially completely random copolymers notwithstanding the relatively small amount of randomizing agents employed relative to the organolithium initiator is a hexaalkylphosphoramide and is represented by the formula

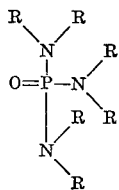

where each R is the same or a different alkyl radical containing from 1 to 8 carbon atoms. The compounds have high boiling points and are soluble in the hydrocarbon diluent used for the polymerization. For example, hexamethylphosphoramide has a boiling point of 76° C. at a pressure of 1 mm. Hg. Other compounds of this type include hexaethylphosphoramide, hexa-n-propylphosphoramide, and hexaoctylphosphoramide, hexaisopropylphosphoramide, trimethyltrihexylphosphoramide, dipropyltetraoctylphosphoramide and the like.

As stated before, by this invention amounts of organoalkali metal randomizers are employed which heretofore yielded a polymer product containing substantial amounts, e.g. 20 percent, of homopolymer blocks and that by the addition of amounts of hexaalkylphosphoramide also heretofore thought to produce a product polymer containing substantial amounts of homopolymer blocks, a substantially completely random copolymer is obtained. Thus, by the combination of the organo-alkali metal and hexaalkylphosphoramide randomizers, a surprisingly lower amount of randomizers than heretofore thought necessary produces a substantially completely random copolymer.

EXAMPLE

A series of runs was made for the copolymerization of butadiene with styrene in the presence of n-butyllithium, potassium tert-butoxide, and hexamethylphosphoramide to produce random copolymers. Each of the randomizing agents was used in very small quantities. The polymerization recipe was as follows:

| | |
|---|---|
| 1,3-butadiene, parts by weight | 75 |
| Styrene, parts by weight | 25 |
| Cyclohexane, parts by weight | 780 |
| n-Butyllithium (BuLi), mhm[1] | [2] 1.0 |
| Hexamethylphosphoramide (HMPA), mhm[1] | Variable |
| Potassium tert-butoxide (t-BuOK), mhm[1] | Varable |
| Temperature, ° F | 122 |
| Time, hours | 18 |

[1] Gram millimoles per 100 grams monomers.
[2] Scavenger level, 0.4 mhm.; effective butyllithium level, 0.6 mhm.

Cyclohexane was charged first after which the reactor was purged with nitrogen. Butadiene and styrene were added followed by the hexamethylphosphoramide, the butyllithium, and then the potassium tert-butoxide. Conversion was quantitative in all runs. At the end of the polymerization, each reaction was terminated with a solution of 2,2'-methylene-bis(4-methyl-6-tert-butylphenol) in a mixture of equal parts by volume of toluene and isopropyl alcohol, the amount used being sufficient to provide approximately one part by weight of the antioxidant per 100 parts by weight of polymer. The product was coagulated in isopropyl alcohol, separated, and dried. Results are presented in Table I.

TABLE

| | HMPA, mhm. | t-BuOK, mhm. | Effective BuLi, mhm. | Effective t-BuOK/BuLi, mole ratio | Effective HMPA/BuLi, mole ratio | Microstructure, percent, normalized [1] | | | Polystyrene[2], percent |
|---|---|---|---|---|---|---|---|---|---|
| | | | | | | Cis | Trans | Vinyl | |
| Run No.: | | | | | | | | | |
| 1 | 0.01 | 0.01 | 0.6 | 0.0167 | 0.0167 | 39.2 | 52.0 | 8.8 | 0.5 |
| 2 | 0.01 | 0.02 | 0.6 | 0.0333 | 0.0167 | 37.7 | 52.0 | 10.3 | 0 |
| 3 | 0.01 | 0.03 | 0.6 | 0.05 | 0.0167 | 38.4 | 49.7 | 11.9 | 0 |
| 4 | 0.02 | 0.01 | 0.6 | 0.0167 | 0.0333 | 39.2 | 51.5 | 9.3 | 0.1 |
| 5 | 0.02 | 0.02 | 0.6 | 0.0333 | 0.0333 | 38.1 | 51.6 | 10.3 | 0 |
| 6 | 0.02 | 0.03 | 0.6 | 0.05 | 0.0333 | 38.6 | 49.7 | 11.7 | 0 |
| 7 | 0.03 | 0.01 | 0.6 | 0.0167 | 0.05 | 37.7 | 52.8 | 9.5 | 0.6 |
| 8 | 0.03 | 0.02 | 0.6 | 0.0333 | 0.05 | 35.6 | 53.6 | 10.8 | 9 |
| 9 | 0.03 | 0.03 | 0.6 | 0.05 | 0.05 | 35.3 | 52.3 | 12.4 | 0 |
| 10 | 0.04 | 0.01 | 0.6 | 0.0167 | 0.067 | 37.3 | 52.7 | 10.0 | 0 |
| 11 | 0.04 | 0.02 | 0.6 | 0.0333 | 0.067 | 37.5 | 51.6 | 10.9 | 0 |
| 12 | 0.04 | 0.03 | 0.6 | 0.05 | 0.067 | 36.9 | 50.7 | 12.4 | 0 |

[1] Determined by infrared analysis.
[2] Determined by oxidative degradation.

These data show that with extremely small amounts of the two randomizers of this invention a substantially completely random copolymer is obtained.

Reasonable variations and modifications are possible within the scope of this discolsure without departing from the spirit and scope thereof.

I claim:
1. The polymerization process for copolymerizing monomers including at least one conjugated diene and at least one vinyl-substituted aromatic compounds comprising contacting said monomers under copolymerization conditions in the presence of a solvent selected from aromatic, paraffinic, cycloparaffinic compounds, and mixtures thereof, with a randomizing catalyst composition consisting essentially of an organolithium initiator, an organoalkali metal compound of the formula: $R'(OM)_n$, wherein R' is an aliphatic radical having from 1 to 20 carbon atoms, M is an alkali metal selected from sodium, potassium, rubidium, and cesium, O is oxygen, and $n$ is an integer from 1 to 3, inclusive, and hexaphosphoramide of the formula

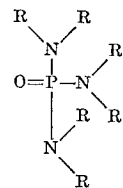

wherein R is an alkyl radical containing from 1 to 8 carbon atoms, said organoalkali metal compound being present in an amount to provide a ratio of alkali atoms in said organoalkali metal compound to mols of hexaphosphoramide in the range of from 5:1 to about 0.035:1, said hexaphosphoramide being present in a ratio of mols of hexaphosphoramide to atoms of lithium in said initiator of from 0.2:1 to 0.01:1 and wherein said organolithium initiator is in a concentration to provide .05 to 150 millimoles per 100 prats by weight monomer.

2. The process of claim 1 wherein said monomers are butadiene and styrene, said organolithium initiator is butyllithium, said organoalkali metal compound in potassium tert-butoxide and said hexaphosphoramide is hexamethylphosphoramide.

3. A randomizing, catalytic composition for forming random copolymers of at least one conjugated diene and at least one vinyl substituted aromatic compound, said composition consisting essentially of an organolithium initiator, an organo-alkali metal compound of the formula: $R'(OM)_n$, wherein $R'$ is an aliphatic radical having from 1 to 20 carbon atoms, M is an alkali metal selected from the group consisting of sodium, potassium, rubidium and cesium, O is oxygen, and $n$ is an integer from 1 to 3, inclusive, and a hexaalkylphosphoramide of the formula

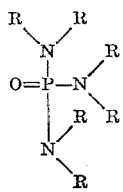

wherein R is an alkyl radical containing from 1 to 8 carbon atoms, said organoalkali metal compound being present in a ratio of alkali atoms in said organoalkli metal compound to mols of phosphoramide in the range of form about 5:1 to about 0.035:1, said phosphoramide being present in a ratio of mols of phosphoramide to atoms of lithium in said initiator of from 0.2:1 to 0.01:1 and wherein said randomizing catalytic composition is in the presence of a solvent selected from aromatic, paraffinic, cycloparaffinic compounds, and mixtures thereof.

4. A composition according to claim 3 wherein said organolithium initiator is selected from the group having the formula $RLi_x$, where R is an aliphatic, cycloaliphatic or aromatic hydrocarbon radical having from 1 to 20 carbon atoms and $x$ is an integer of from 1 to 4, said organo-alkali metal compound is potassium tert-butoxide, and said phosphoramide is hexamethylphosphoramide.

5. A composition according to claim 3 wherein said phosphoramide is present in a ratio of mols of phosphoramide to atoms of litium in said initiator of from 0.1:1 to 0.01:1.

6. A composition according to claim 3 wherein said organo-alkali metal is one of sodium and potassium, and $n$ is 1.

References Cited
UNITED STATES PATENTS

| | | | |
|---|---|---|---|
| 3,366,611 | 1/1968 | Wofford | 260—84.7 |
| 3,288,872 | 11/1966 | House | 260—669 |
| 3,324,191 | 6/1967 | Wofford | 260—669 |

JOSEPH L. SCHOFER, Primary Examiner

J. C. HAIGHT, Assistant Examiner

U.S. Cl. X.R.

252—43.1; 260—82.1, 83.7